US008655935B2

(12) United States Patent
Hondou et al.

(10) Patent No.: US 8,655,935 B2
(45) Date of Patent: Feb. 18, 2014

(54) PROCESSING APPARATUS AND CONTROL METHOD PERFORMING TAYLOR SERIES OPERATION ASSOCIATED WITH EXECUTING FLOATING POINT INSTRUCTION

(75) Inventors: Mikio Hondou, Kawasaki (JP); Ryuji Kan, Kawasaki (JP); Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1392 days.

(21) Appl. No.: 12/047,782

(22) Filed: Mar. 13, 2008

(65) Prior Publication Data

US 2008/0228846 A1 Sep. 18, 2008

(30) Foreign Application Priority Data

Mar. 16, 2007 (JP) .................. 2007-069614

(51) Int. Cl.
*G06F 1/02* (2006.01)

(52) U.S. Cl.
USPC ........................................ 708/270

(58) Field of Classification Search
USPC ........................ 708/503, 270–277
See application file for complete search history.

(56) References Cited

U.S. PATENT DOCUMENTS

| 5,042,001 A * | 8/1991 | Brightman et al. ........... 708/490 |
| 7,117,238 B1 * | 10/2006 | Foskett et al. ................ 708/502 |
| 2005/0071401 A1 * | 3/2005 | Clifton .......................... 708/290 |
| 2005/0131975 A1 * | 6/2005 | Okutani et al. ............... 708/400 |

OTHER PUBLICATIONS

Lars Nyland and Mark Snyder, Fast Trigonometric Functions Using Intel's SSE2 Instructions, 2003, Information and Telecommunication Technology Center (ITTC) of University of Kansas, pp. 1-11.*

* cited by examiner

*Primary Examiner* — Chuong D Ngo
*Assistant Examiner* — Kevin G Hughes
(74) *Attorney, Agent, or Firm* — Staas & Halsey LLP

(57) ABSTRACT

A processing apparatus comprising a register that stores operand data, a register data reading section that reads operand data stored in the register, a coefficient table set storage section that stores a coefficient table storing Taylor series operation coefficient data, a coefficient data reading section that reads the Taylor series coefficient data from the coefficient table set storage section using the degree information of the Taylor series and the coefficient table identification information and a floating point multiply-adder that executes the Taylor series operation using the coefficient data read by the coefficient data reading section, data read from the register.

6 Claims, 8 Drawing Sheets

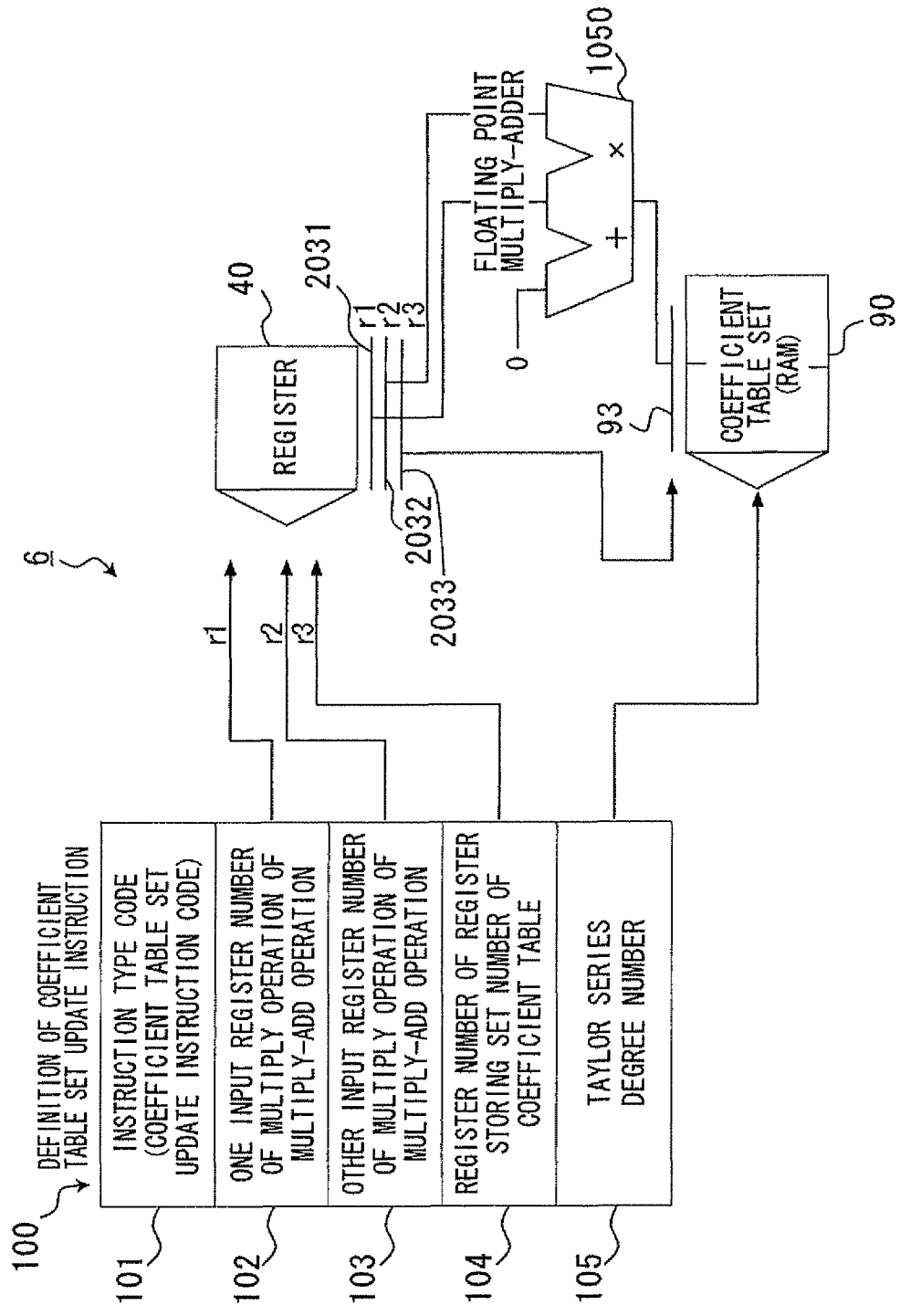

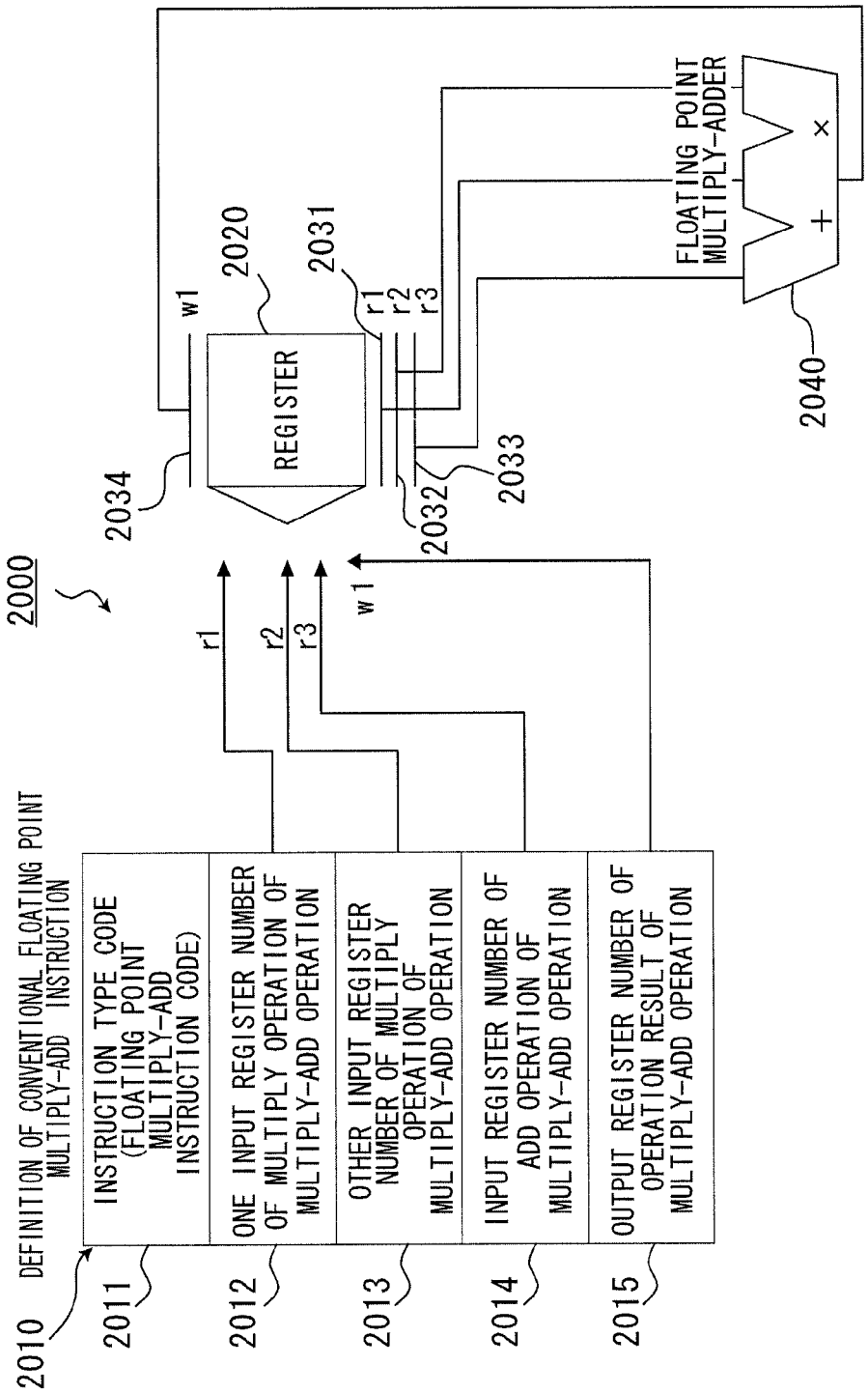

PROCESSING APPARATUS AND CONTROL METHOD PERFORMING TAYLOR SERIES OPERATION ASSOCIATED WITH EXECUTING FLOATING POINT INSTRUCTION

CROSS-REFERENCE TO RELATED APPLICATIONS

This application claims the benefit of priority from Japanese Patent Application No. 2007-69614, filed on Mar. 16, 2007, in the Japanese Patent Office, the disclosure of which is incorporated herein by reference.

BACKGROUND

1. Field of the Invention

The present invention relates to a processing apparatus and control method thereof for carrying out a floating point multiply-add operation, and more particularly, to a processing apparatus and control method thereof suitable for use in Taylor series operations.

2. Description of the Related Art

A mathematical function f(x) can be expressed by a Taylor series operation as shown in Formula (1) below.

Therefore, a value of the mathematical function f(x) for an arbitrary value x can be obtained by performing a Taylor series operation in Formula (1).

$$f(x) = \sum_n \frac{1}{n!} f^{(n)}(x_0) \cdot (x - x_0)^n$$

Here, coefficient data $$\frac{1}{n!} f^{(n)}(x_0)$$

of the Taylor series operation expressed by above described Formula (1) varies depending on the type of the mathematical function f(x) and the degree of Taylor series.

For this reason, the conventional processing apparatus stores the Taylor series coefficient data associated with the mathematical function f(x) and degree in a memory (main memory) using a table model.

When the value of the mathematical function f(x) is calculated through a Taylor series operation, necessary coefficient data is read from the memory.

As described above, the conventional processing apparatus stores coefficient data necessary for a Taylor series operation of a mathematical function in a memory.

Therefore, when executing Taylor series operation processing, the conventional processing apparatus executes a floating point load instruction, loads the coefficient data from the memory into a register and then executes a floating point multiply-add instruction and performs a Taylor series operation using the coefficient data loaded into the register.

FIG. 8 shows the system configuration of a processing apparatus provided with a conventional Taylor series operation function.

A conventional processing apparatus 2000 shown in FIG. 8 performs a Taylor series operation of a mathematical function by executing a floating point multiply-add instruction 2010 shown on the left of FIG. 8.

The floating point multiply-add instruction 2010 is made up of five fields 2011 to 2015.

An "instruction type code (floating point multiply-add instruction code)" is set in the field 2011, a "one input register number of multiply operation of multiply-add operation" is set in the field 2012 and the "other input register number of multiply operation of multiply-add operation" is set in the field 2013.

Furthermore, the "input register number of add operation of multiply-add operation" is set in the field 2014 and the "output register number of operation result of multiply-add operation" is set in the field 2015.

A register number is a number uniquely assigned to each register.

When the floating point multiply-add instruction 2010 is decoded, the value (assumed to be data y) of a register with register number r1 set in the field 2012 (hereinafter referred to as "register r1") is read from the register 2020 and the data y is inputted to the floating point multiply-adder 2040 through a multiplexer 2031.

Furthermore, the value (assumed to be data z) of a register with register number r2 set in the field 2013 (hereinafter referred to as "register r2") is read from the register 2020 and the data z is inputted to the floating point multiply-adder 2040 through a multiplexer 2032.

Furthermore, the value (assumed to be data ai) of a register with register number r3 set in the field 2014 (hereinafter referred to as "register r3") is read from the register 2020 and the data ai is inputted to the floating point multiply-adder 2040 through a multiplexer 2033.

Upon receiving the above described three pieces of data y, z and ai as input, the floating point multiply-adder 2040 performs floating point multiply-add operation of (y×z+ai) and writes the operation result into the register of register number w1 set in the field 2015 (hereinafter referred to as "register w1") through a multiplexer 2034.

The processing apparatus 2000 repeatedly executes the floating point multiply-add instruction 2010 every time the floating point multiply-add instruction 2010 for a Taylor series operation program is fetched, thereby performs a Taylor series operation of mathematical function and calculates a value of the mathematical function f(x).

As described above, since the conventional processing apparatus 2000 stores coefficient data of a Taylor series of mathematical function in the main memory, it would perform a Taylor series multiply-add operation using a floating point load instruction and a floating point multiply-add instruction.

This produces overhead caused by processing of transferring Taylor series coefficient data from the main memory to a cache memory.

Furthermore, since the above described floating point load instruction needs to be executed, this puts pressure on throughput of a load/store pipeline or pressure on throughput of an instruction issue stage of an instruction pipeline, which becomes a factor that drives the deterioration of processing performance of a Taylor series operation.

SUMMARY

According to an example embodiment of the present invention a processing apparatus and a control method thereof are capable of executing Taylor series operations at high speed without using any floating point load instruction.

According to an example embodiment a dedicated storage is provided for storing coefficient data of a Taylor series operation of mathematical function, reads the coefficient data from the storage and executes a Taylor series operation by only executing an instruction for instructing a Taylor series operation of mathematical function without executing any floating point load instruction.

This produces no overhead accompanying processing of transferring Taylor series coefficient data from the main memory to the cache memory or pressure on throughput of the load/store pipeline or pressure on throughput of the instruction issue stage of the instruction pipeline or the like as in the case of the conventional processing apparatus, and can thereby execute a Taylor series operation of mathematical function at high speed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the example embodiments, taken in conjunction with the accompanying drawings of which:

FIG. 7 is a block diagram illustrating parts of a processing apparatus which is of an example embodiment; and FIG. 8 shows the system configuration of a processing apparatus provided with a conventional Taylor series operation function.

DETAILED DESCRIPTION OF THE PREFERRED EXAMPLE EMBODIMENTS

Figure 1:
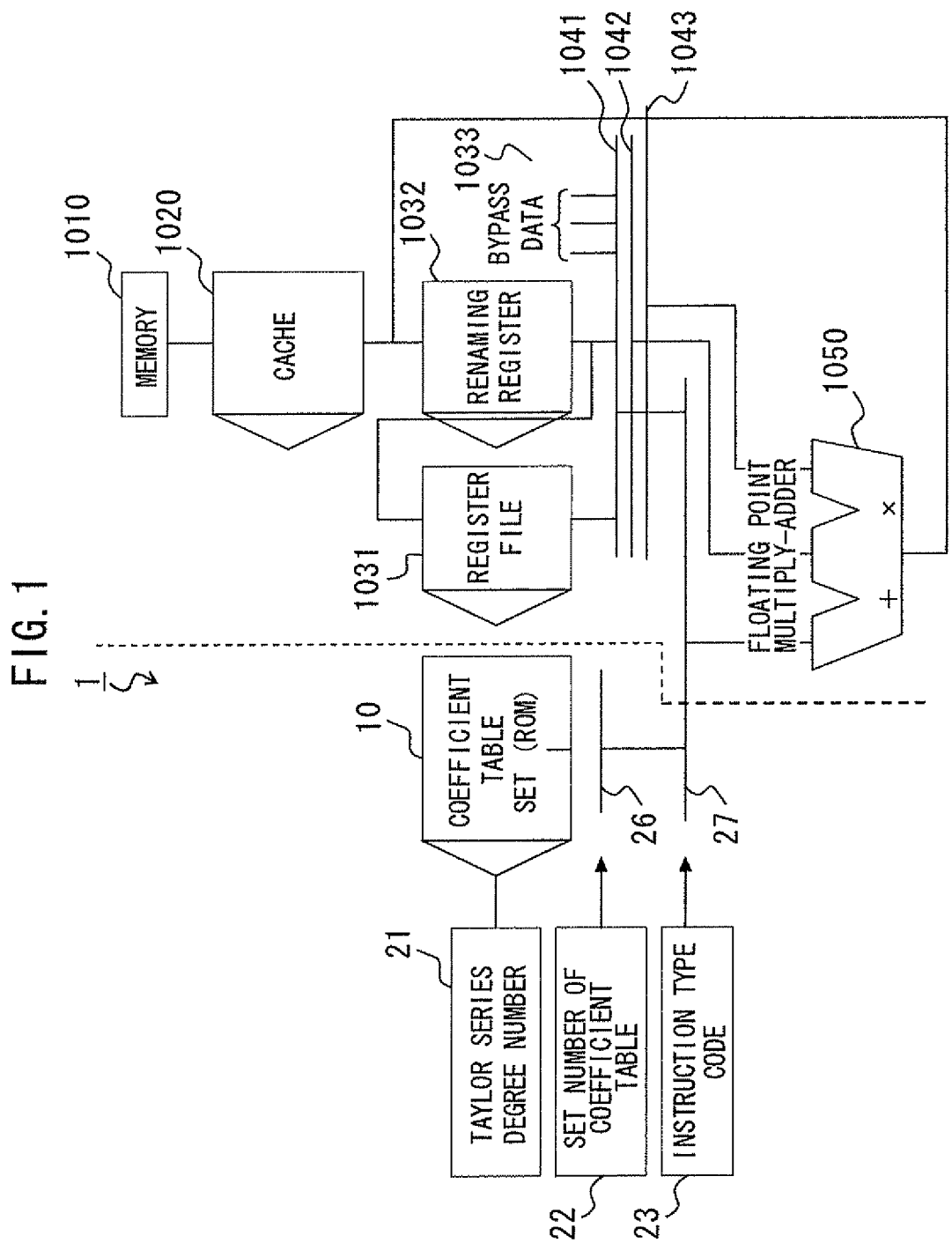
FIG. 1 is a block diagram illustrating an example system configuration of a processing apparatus anof an example embodiment.

Hereinafter, example embodiments of the present invention will be explained with reference to drawings. Reference will now be made in detail to the example embodiments, examples of which are illustrated in the accompanying drawings, wherein like reference numerals refer to the like elements throughout. The example embodiments are described below to explain the present invention by referring to the figures.

The processing apparatus of the present invention provides a coefficient table that stores coefficient data of a Taylor series operation of an arbitrary mathematical function for each mathematical function and stores a coefficient table set which is a set of a plurality of those coefficient tables in a dedicated memory (ROM or RAM or the like).

Coefficient data necessary for a Taylor series operation is directly read from the coefficient table, supplied to the floating point multiply-adder and a Taylor series operation is executed by the floating point multiply-adder.

In this way, the processing apparatus of the present invention is configured so as to directly supply coefficient data of a Taylor series operation from the coefficient table set to the floating point multiply-adder.

This eliminates the necessity for processing of transferring the coefficient data of Taylor series operation from the main memory to the cache memory as in the case of the conventional processing apparatus.

Furthermore, since the floating point load instruction is not necessary either, it is possible to eliminate pressure on the load/store pipeline caused by loading of the coefficient data of Taylor series operation from the memory to the register and pressure on throughput in the instruction issue stage of the instruction pipeline.

First Example Embodiment

FIG. 1 is a block diagram showing the system configuration of a processing apparatus which is an example embodiment of the present invention.

In the processing apparatus 1 shown in FIG. 1 which is this example embodiment, the portion on the right side of a vertical dotted line in the center of the drawing has a configuration similar to that of the conventional processing apparatus.

A feature in the configuration of the processing apparatus 1 is that it is provided with a coefficient table set 10 as shown on the left side of the dotted line in FIG. 1.

This coefficient table set 10 stores a plurality of coefficient tables of mathematical function.

Furthermore, "Taylor series degree number 21 (hereinafter, may also be described as "degree number 21")", "coefficient table set number 22 (hereinafter, may also be described as "set number 22)" and "instruction type code 23" are also used as information for selecting coefficient data in the coefficient table set 10.

The degree number 21 is a parameter corresponding to a degree n of the Formula (1).

The set number 22 is a parameter to select one coefficient table from among a plurality of coefficient tables in the coefficient table set 10.

A unique set number is assigned to each coefficient table of this example embodiment and the individual coefficient tables can be specified by the set numbers.

The instruction type code 23 is an operation code indicating the type of instruction.

The coefficient table set 10 is a set of coefficient tables storing coefficient data of Taylor series operation of mathematical function.

This coefficient table set 10 is mounted in a semiconductor memory such as ROM (Read Only Memory) or RAM (Random Access Memory).

Each column of the coefficient table set 10 stores a coefficient table for each mathematical function.

Each column of the coefficient table is specified by a set number assigned to each coefficient table.

Each row of the coefficient table stores coefficient data of Taylor series operation of each mathematical function.

Each row number of the coefficient table corresponds to the degree number 21 and each row of the coefficient table is specified by the degree number 21.

In order to acquire desired coefficient data from the coefficient table set 10 about a certain mathematical function, the coefficient table set 10 is selected according to the degree number 21 first.

This causes data of a row corresponding to the degree number 21 of the coefficient table set 10 to be read from the coefficient table set 10 and the row data is inputted to a multiplexer 26.

This row data includes coefficient data of all coefficient tables corresponding to the degree number 21.

The set number 22 is inputted to a multiplexer 32 as a select signal.

The multiplexer 32 selects and outputs coefficient data of a column corresponding to the set number 22 from the coefficient data included in the row data.

In this way, the degree number 21 corresponds to a row address of the coefficient table set 10 and the set number 22 corresponds to a column address of the coefficient table set 10, and inputting the degree number 21 and the set number 22 to the coefficient table set 10 allows coefficient data stored in the area of the address determined by the row address and the column address of the coefficient table set 10 to be read.

Since the set number 22 corresponds to the coefficient table of mathematical function and the degree number 21 corresponds to the degree of coefficient data of Taylor series operation, the coefficient data read from the coefficient table set 10 is coefficient data of the degree corresponding to the degree number 21 of the Taylor series operation of mathematical function.

In addition to the coefficient data, operand data selected by a multiplexer 1041 is inputted to the multiplexer 27.

The multiplexer 1041 receives three types of operand data; register data outputted from a register file 1031, data outputted from a renaming register (rename register) 1032 and bypass data 1033 as input, selects any one of the three types of operand data and outputs the operand data to the multiplexer 27.

The instruction type code 23 is inputted to the multiplexer 27 as a select signal.

The multiplexer 27 outputs any one of the output (the coefficient data) of the multiplexer 27 and the output (the operand data) of the multiplexer 1041 to a floating point multiply-adder 1050 according to the instruction type code 23.

In this example embodiment, when the instruction type code 23 is a Taylor series multiply-add instruction, the multiplexer 27 selects and outputs the coefficient data to the floating point multiply-adder 1050.

Multiplexers 1042 and 1043 described below the multiplexer 1041 in FIG. 1 receive the above described three types of operand data as input as in the same way as the multiplexer 1041 and output the selected operand data to the floating point multiply-adder 1050.

The floating point multiply-adder 1050 executes a Taylor series operation by performing a multiply-add operation using the coefficient data inputted from the multiplexer 27, the operand data inputted from the multiplexer 1042 (first operand data) and the operand data inputted from the multiplexer 1043 (second operand data).

As the conventional configuration, the processing apparatus 1 of this example embodiment includes a memory (main memory) 1010, a cache memory 1020, the register file 1031, the renaming register 1032, the bypass data 1033, the multiplexers 1041 to 1043 and the floating point multiply-adder 1050.

The register file 1031 includes all registers used when the floating point multiply-adder 1050 executes an operation.

The renaming register 1032 is provided to eliminate reverse dependency and output dependency of the operand data.

The bypass data 1033 is data (operation result data) used for bypassing to eliminate data hazard in the instruction pipeline of the processing apparatus 1.

The register value stored in the entry of the renaming register 1032 is moved to the register file 1031 when it is retired.

When the processing apparatus 1 of this example embodiment executes a Taylor series operation, the coefficient data stored in the coefficient table set 10, register file 1031 and register data stored in the renaming register 1032 or bypass data are supplied to the floating point multiply-adder 1050 and the floating point multiply-adder 1050 performs a multiply-add operation using those data.

Figure 2:
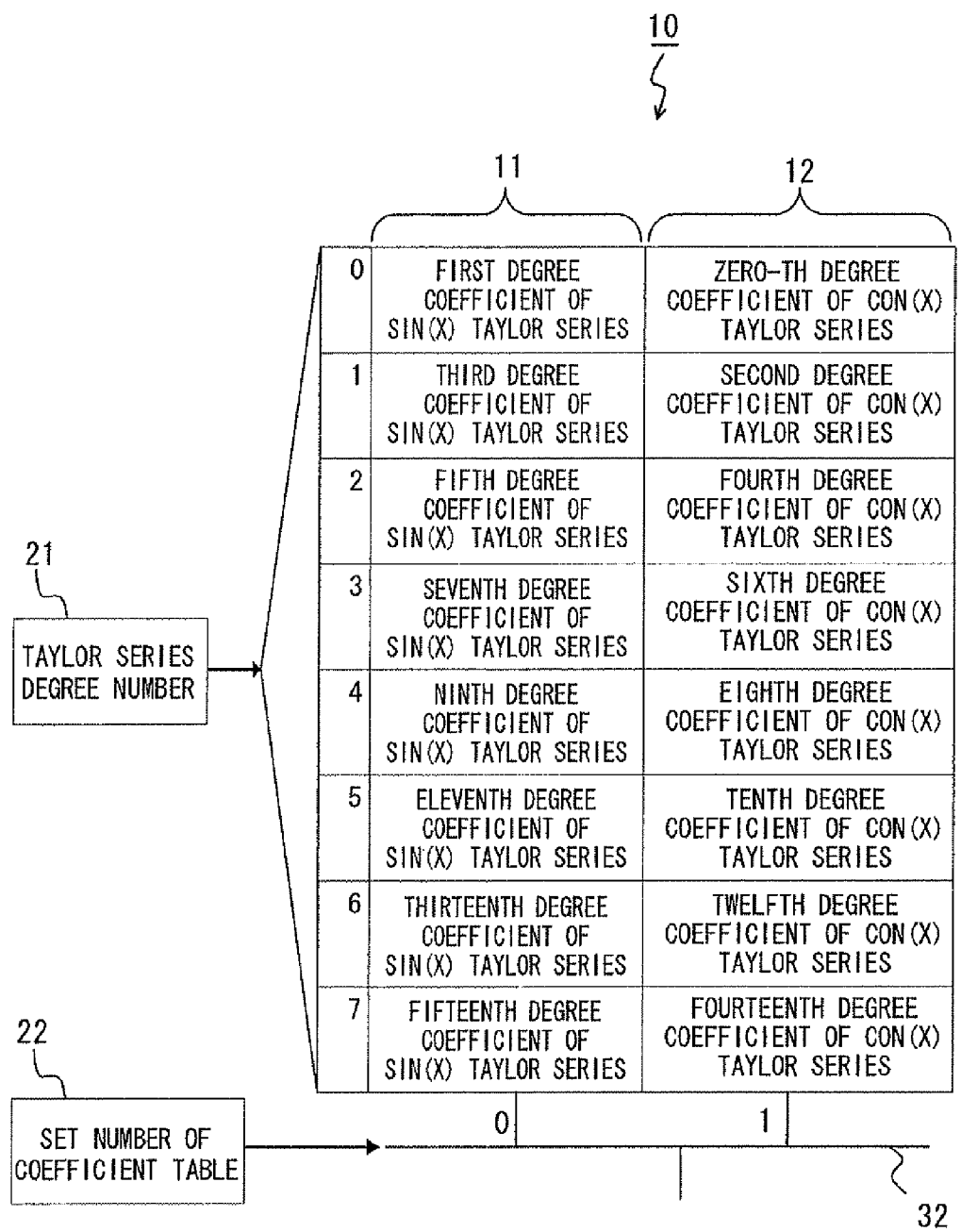
FIG. 2 is a block diagram illustrating a configuration example of a coefficient table set.

FIG. 2 shows a specific example of arrangement structure of the coefficient table set 10 of Taylor series operation when the processing apparatus 1 in FIG. 1 handles two mathematical functions of $\sin(x)$ and $\cos(x)$.

The coefficient table set 10 shown in FIG. 2 is made up of two columns and stores a coefficient table 11 of $\sin(x)$ on the first column and a coefficient table 12 of $\cos(x)$ on the second column.

"0" is assigned as a set number to the coefficient table 11 of $\sin(x)$ on the first column and "1" is assigned as a set number to the coefficient table 12 of $\cos(x)$ on the second column.

The coefficient table set 10 is made up of ten rows (ten entries) and coefficient data of $\sin(x)$ and $\cos(x)$ are stored on each row.

The Taylor series of $\sin(x)$ has coefficient data of only odd number degrees and the Taylor series of $\cos(x)$ has coefficient data of only even number degrees.

For this reason, the coefficient table 11 of $\sin(x)$ stores first degree, third degree, . . . fifteenth degree coefficient data on the 0th, second, . . . seventh row respectively.

On the other hand, the coefficient table 12 of $\cos(x)$ stores 0th degree, second degree, . . . fourteenth degree coefficient data on the 0th, second, . . . seventh row respectively.

The Taylor series degree number 21 which is an input signal of the coefficient table set 10 matches the row number of the coefficient table set 10.

However, as for the coefficient table set 10, the degree number 21 of Taylor series does not match the degree number of the coefficient data stored in the row indicated by the degree number 21 of the Taylor series.

Thus, it should be noted that the degree number 21 of Taylor series which is the input signal of the coefficient table set 10 does not necessarily match the degree number of coefficient data of mathematical function.

This is because in the cases of an odd function such as $\sin(x)$ and an even function such as $\cos(x)$, their respective Taylor series are characterized by having coefficient data with only odd number degrees and coefficient data with only even number degrees.

In the coefficient table set 10 (coefficient tables 11 and 12) according to this example embodiment, areas for degrees having no coefficient data are omitted so that coefficient data are arranged efficiently and the memory capacity of the coefficient table set 10 is reduced.

Since the coefficient table set 10 is configured as shown above, when the first degree coefficient data of Taylor series of $\sin(x)$ is read from the coefficient table set 10 (coefficient table 11), "0" should be set in the degree number 21 of Taylor series.

On the other hand, when the second degree coefficient data of Taylor series of $\cos(x)$ is read from the coefficient table set 10 (coefficient table 12), "1" should be set in the degree number 21 of Taylor series.

The degree number 21 of Taylor series is set in the same way when other coefficient data is read from the coefficient table set 10, too.

In this example embodiment, the degree number 21 is inputted to the coefficient table set 10, the row data of the row number that matches the corresponding degree number is read from the coefficient table set 10 and the row data is inputted to the multiplexer 27.

The set number 22 is then added to the multiplexer 27 as a select signal. The set number 22 is set to "0" in the case of sin(x) and "1" in the case of cos(x). When this select signal is inputted to the multiplexer 27, the coefficient data specified by the set number 22 is selected and outputted from the multiplexer 27 and this is inputted to the floating point multiply-adder 1050.

Figure 3:
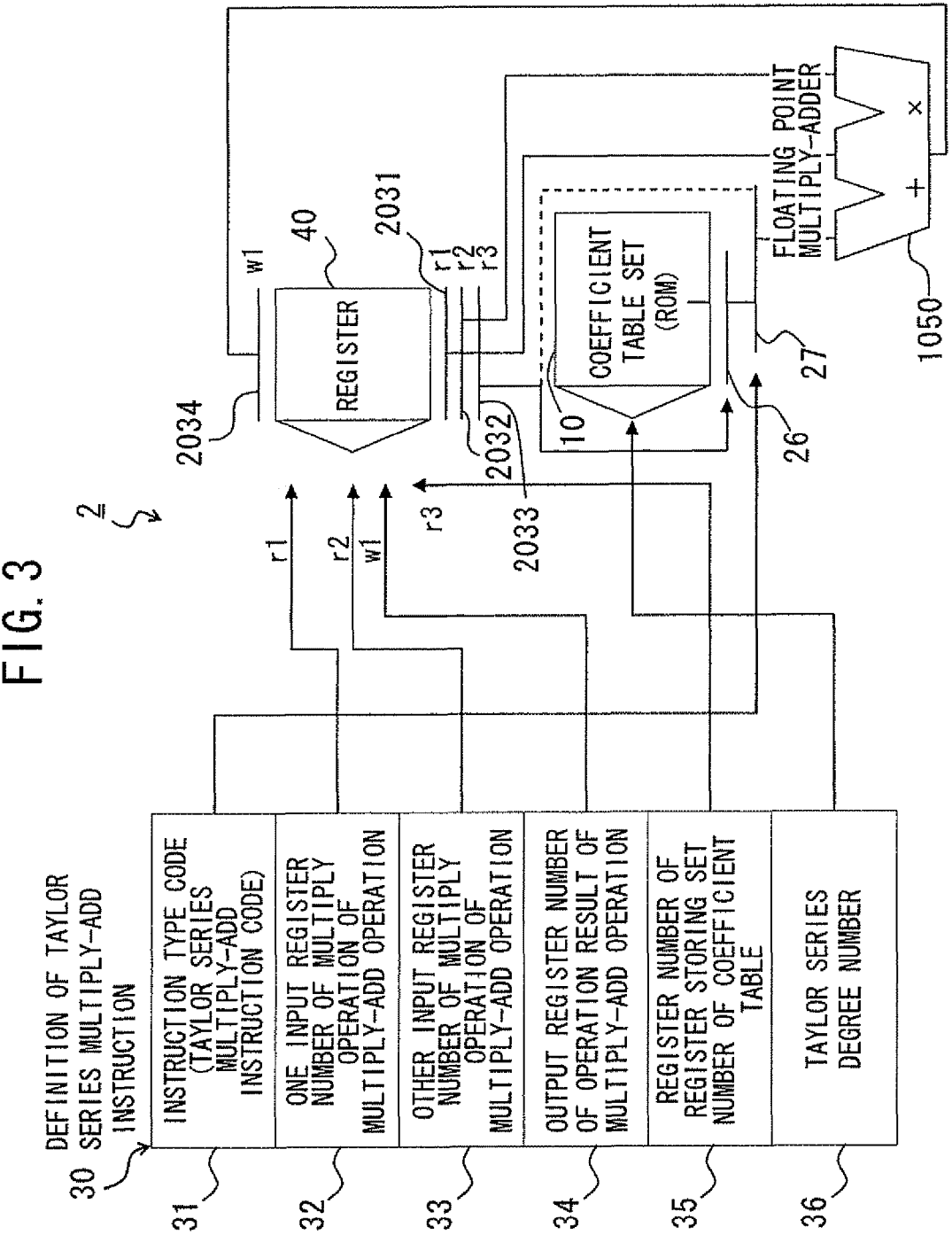
FIG. 3 is a block diagram illustrating an example configuration of parts of a processing apparatus of an example embodiment.

The floating point multiply-adder 1050 carries out a multiply-add operation using the inputted coefficient data and executes a Taylor series operation of sin(x) or cos(x).

example embodiment FIG. 3 shows the configuration of main parts of a processing apparatus which is an example embodiment of the present invention.

Here, a dotted line which connects a multiplexer 2033 and a floating point multiply-adder 1050 in FIG. 3 indicates a signal line of operand data used when the floating point multiply-adder 1050 executes a conventional floating point multiply-add operation. The same will apply to the drawings of example embodiments which will be described later.

The processing apparatus 2 of this example embodiment introduces a new instruction (Taylor series multiply-add instruction) 30 shown on the left side of FIG. 3 and can execute this instruction 30.

The Taylor series multiply-add instruction 30 shown in FIG. 3 is constructed of six fields 31 to 36. A Taylor series multiply-add instruction code is set in the instruction type code setting field 31.

As is apparent when the Taylor series multiply-add instruction 30 in FIG. 3 is compared with the field of the floating point multiply-add instruction 2010 in FIG. 8, operand data similar to those in fields 2012, 2013, 2015 of the floating point multiply-add instruction 2010 are set in the respective fields 32, 33, 34 of the Taylor series multiply-add instruction 30.

That is, "one input register number (r1) of multiply operation of multiply-add operation" is set in the field 32, "the other input register number (r2) of multiply operation of multiply-add operation" is set in the field 33 and "output register number (w1) of multiply operation of multiply-add operation" is set in the field 34.

The "register number (r3) in which the set number of coefficient table is recorded (stored)" is set in the field 35 of the Taylor series multiply-add instruction 30.

Furthermore, the "Taylor series degree number" is set in the field 36 of the Taylor series multiply-add instruction 30.

It should be noted that the definition of the above described Taylor series multiply-add instruction 30 only shows instruction type codes and operands required for the Taylor series multiply-add instruction 30 and is not intended to define the order of writing operands in actual programming instructions (e.g., assembler instructions).

Therefore, the operand writing order of a programming instruction need not follow the notation order of the fields 32 to 36 shown in FIG. 3. The same applies to example embodiments other than this example embodiment.

Thus, in the operand fields of the Taylor series multiply-add instruction 30, the field of setting the input register number 2014 of the multiply-add operation is removed from the floating point multiply-add instruction 2010 provided for the instruction set of the conventional processing apparatus and the fields of setting the "degree number (r3) of coefficient table" and "Taylor series degree number" are added instead.

In the following explanations, for convenience of explanation, parameters set in the fields 32 to 36 of the Taylor series multiply-add instruction 30 may also be expressed as one input register number of multiply operation of multiply-add operation 32, other input register number of multiply operation of multiply-add operation 33, output register number of operation result of multiply-add operation 34, register number of the register storing the set number of the coefficient table 35 and the Taylor series degree number 36.

The same will apply to other example embodiments.

The Taylor series degree number 36 of this example embodiment is the same as the Taylor series degree number 21 in FIG. 1.

Furthermore, the register 40 shown in FIG. 3 includes the register file 1031, renaming register 1032 and bypass data 1033 in FIG. 1.

The same will also apply to example embodiments which will be described later.

Set number specification according to the coefficient table of the Taylor series multiply-add instruction 30 is not the direct designating method but the register indirect designating method using the register number 35 of the register storing the set number of the coefficient table.

This is because even for the same mathematical function f(x), the set number of the coefficient table specified varies depending on the value of an input argument x.

This will be explained in detail by taking a sin function as an example.

Since the sin function is a cyclic function (function having a cycle of $2\pi$), the calculation formula can be configured by dividing the section of $\{-\pi/4+2n\pi$ to $+7\pi/4+2n\pi\}$ into four areas as shown in 1 to 4 below.

1. x=$-\pi/4+2n\pi$ to $+\pi/4+2n\pi$ sin(x)=sin(x$-2n\pi$)
2. x=$+\pi/4+2n\pi$ to $+3\pi/4+2n\pi$ sin(x)=cos(x$-\pi/2-2n\pi$)
3. x=$+3\pi/4+2n\pi$ to $+5\pi/4+2n\pi$ sin(x)=$-$sin(x$-\pi-2n\pi$)
4. X=$+5\pi/4+2n\pi$ to $+7\pi/4+2n\pi$ sin(x)=$-$cos(x$-3\pi/2-2n\pi$)

Here, the calculation formula is configured for each area because arguments used in Taylor series operations need to converge at a high degree.

For example, an input argument y=x$-\pi/2-2n\pi$ of a calculation formula cos(x$-\pi/2-2n\pi$) in the area of x=$+\pi/4+2n\pi$ to $+3\pi/4+2n\pi$ satisfies the range of value in 5 below, and it is understandable that cos(y) (=sin(x)) converges at a high degree of argument y.

5. y=$-\pi/4$ to $+\pi/4$

In other areas, since the input argument x(y) of sin(x) (=$\pm$sin(y), $\pm$cos(y)) satisfies the range of the value $-\pi/4$ to $+\pi/4$, sin(x) can converge at a high degree.

As shown in 1 to 4 above, for even the same sin function (=sin(x)), the calculation formula (function) to be used varies depending on the range of the value of input argument x, and therefore the set of coefficient tables to be used for Taylor series operations also varies as shown in 6 to 9 below.

6. x=$-\pi/4+2n\pi$ to $+\pi/4+2n\pi$ coefficient table of sin(x) Taylor series operation
7. x=$+\pi/4+2n\pi$ to $+3\pi/4+2n\pi$ coefficient table of cos(x) Taylor series operation
8. x=$+3\pi/4+2n\pi$ to $+5\pi/4+2n\pi$ coefficient table of sin(x) Taylor series operation
9. x=$+5\pi/4+2n\pi$ to $+7\pi/4+2n\pi$ coefficient table of cos(x) Taylor series operation The necessity that the set numbers of the coefficient table should be register indirect specification in the Taylor series multiply-add instruction 30 has been shown so far.

This example embodiment applies register indirect specification to the set numbers of the coefficient table, and can thereby express a Taylor series operation of mathematical function for arbitrary input argument values using an instruction stream of the same instruction without using any conditional branch instruction and can apply software pipelining and SIMD (Single Instruction stream-Multiple Data stream).

Next, a specific example of use of the Taylor series multiply-add instruction 30 defined above will be shown by taking a sin function as an example.

When a sin(x) input argument decision proves that x falls within a range of x=−π/4+2nπ to +π/4++2nπ, sin(x) is expressed by the following Taylor series operation through input argument conversion.

$$\sin(x) = \sin(x - 2n\pi)$$
$$= \sin(y)$$
$$= \sum_n \frac{1}{(1+2n)!}(-1)^n y^{1+2n}$$
$$= \sum_n a_n y^{1+2n}$$

Here, sin(x) corresponds to the coefficient data with a degree number n in the coefficient table 11 (coefficient table of sin(x) Taylor series operation) with the set number 0 in FIG. 2.

When the Taylor series operation up to the fifteenth degree of the sin(y) Taylor series is obtained, $$\sin(y) = \sum_{n=0}^{7} a_n y^{1+2n}$$
$$= ((((((a_7 y^2 + a_6)y^2 + a_5)y^2 + a_4)y^2 + a_3)y^2 + a_2)y^2 + a_1)y^2 + a_0)y$$

The above described sin(y) Taylor series operation can be performed by sequentially executing the following plurality of multiply-add operations.

$$z = z \cdot 0 + a_7$$
$$z = z \cdot y^2 + a_6$$
$$z = z \cdot y^2 + a_5$$
$$z = z \cdot y^2 + a_4$$
$$\ldots$$
$$z = z \cdot y^2 + a_1$$
$$z = z \cdot y^2 + a_0$$
$$z = z \cdot y$$
$$z => \sin(y)$$

Therefore, as shown in 11 to 15 below, when a "register number" or "value" is set in each specified field 32 to 36 of the Taylor series multiply-add instruction 30 in FIG. 2 and a multiply-add operation for obtaining z is successively executed a plurality of times, the value of sin(y) can be calculated, as follows.

11. Register number of the register storing one input register number 32:z of multiply operation of multiply-add operation 12. Register number of the register storing the other input register number 33:0 or y2 of multiply operation of multiply-add operation 13. Register number of the register storing output register number 34:z of operation result of multiply-add operation 14. Register number of the register storing register number set number 35:0 of the register storing the set number of the coefficient table 15. Value of degree number 36: 0 to 7 of Taylor series A case other than the case where the range of input argument x is {x=−π/4+2nπ to +π/4+2nπ} can be likewise expressed by Taylor series operation after an input argument decision and input argument conversion.

A specific assembler instruction stream is shown below when the sin(y) Taylor series operation is executed using a Taylor series multiply-add instruction (ftrimaddd).

In this example, an assembler instruction of the Taylor series multiply-add instruction 30 is defined as follows.

Here, ftrimaadd is a notation in the assembler instruction of the instruction type code 31 of the Taylor series multiply-add instruction 30.

Furthermore, the order of the operand field (part in angle brackets) of this assembler instruction is partially different from that of the operand field of the Taylor series multiply-add instruction 30 in FIG. 2.

ftrimaddd<one input register number of multiply operation of multiply-add operation>,
    <other input register number of multiply operation of multiply-add operation>,
    <register number of register storing set number of coefficient table>,
    <Taylor series degree number>,
    <output register number of operation result of multiply-add operation>

This example embodiment sets one input register number of multiply operation of multiply-add operation 32 to "8", the other input register number of multiply operation of multiply-add operation 33 to "0" or "2", the register number of the register storing the set number of the coefficient table 35 to "6" and the output register number of operation result of multiply-add operation 34 to "8".

The register number i is represented as %%fi.

In this way, the assembler instruction ftrimadddd represents one input register number of multiply operation of multiply-add operation 32 as %%f8, other input register number of multiply operation of multiply-add operation 33 as %%f0 or %%f2, register number storing the set numbers of the coefficient table 35 as %%f4 and the other input register number of multiply operation of multiply-add operation 33 as %%f6.

Here, %%f0=0, %%f2=y2, %%f4=0, %%f6=0 and %%f8=z are set.

That is, "0" is set in the register r0 of register number 0 (%%f0), "y2" is set in the register r2 of register number 2 (%%f2), "y" is set in the register r4 of register number %%f4, "0" is set in the register r6 of register number 6(%%f6) and "z" is set in the register r8 of register number 8(%%f8).

In this case, the assembler instruction stream for obtaining the value of sin(x)(=sin(y)) up to the fifteenth degree of Taylor series operation is as follows:

```
ftrimaddd    %%f8, %%f0, %%f6, 7, %%f8
ftrimaddd    %%f8, %%f2, %%f6, 6, %%f8
ftrimaddd    %%f8, %%f2, %%f6, 5, %%f8
ftrimaddd    %%f8, %%f2, %%f6, 4, %%f8
ftrimaddd    %%f8, %%f2, %%f6, 3, %%f8
ftrimaddd    %%f8, %%f2, %%f6, 2, %%f8
ftrimaddd    %%f8, %%f2, %%f6, 1, %%f8
ftrimaddd    %%f8, %%f2, %%f6, 0, %%f8
fmuld        %%f8, %%f4, %%f8
``` where fmuld is an assembler instruction to execute a multiply operation of z=z·y.

Figure 4:
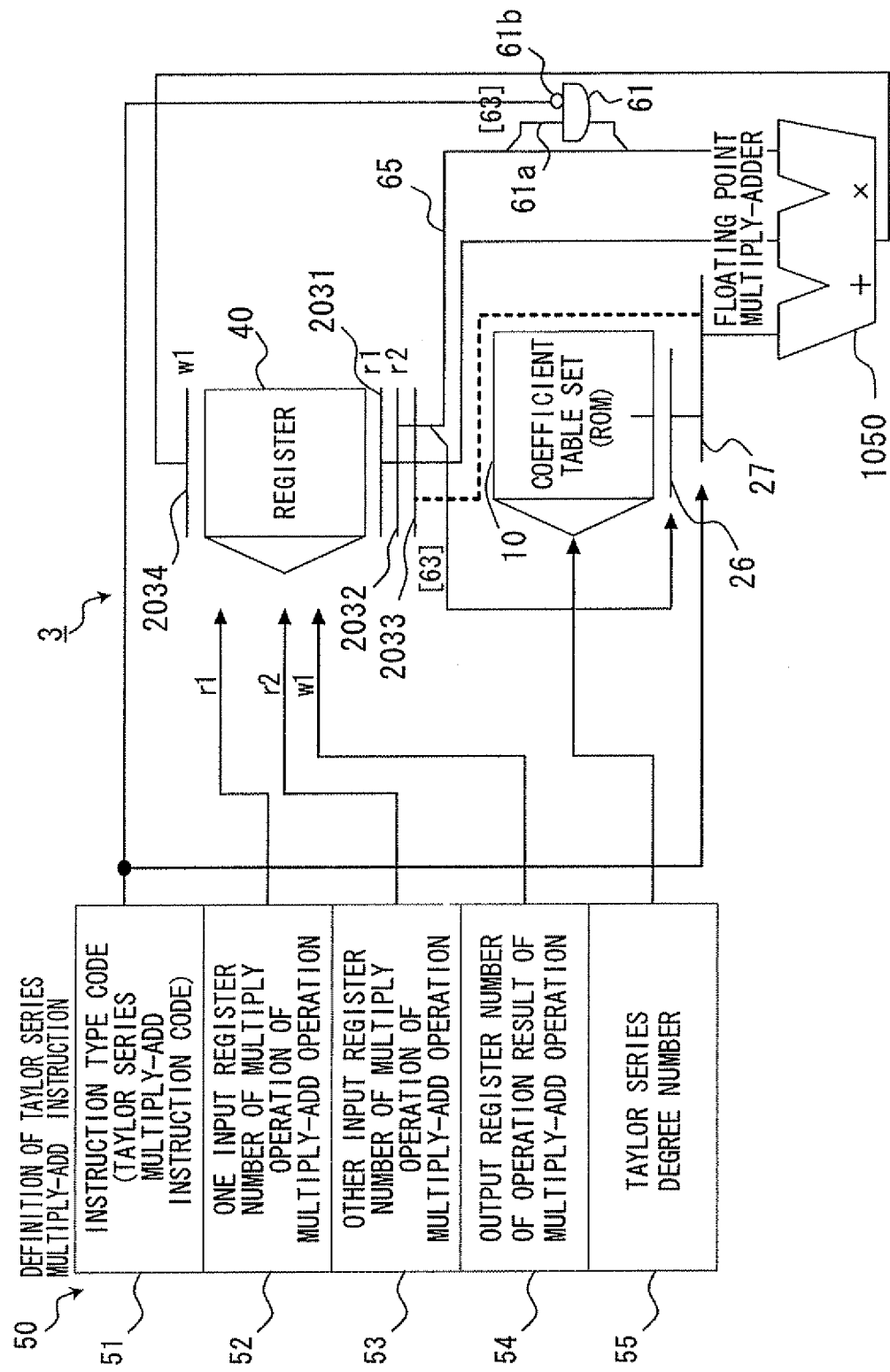
FIG. 4 is a block diagram illustrating a configuration of parts of a processing apparatus of an example embodiment.

FIG. 4 is a block diagram showing the configuration of main parts of a processing apparatus which is an example embodiment of the present invention.

A processing apparatus 3 of this example embodiment includes a Taylor series multiply-add instruction 50 shown on the left side of FIG. 4 in an instruction set.

This Taylor series multiply-add instruction 50 is made up of five fields 51 to 55.

The field 51 is an instruction type code setting field and a "Taylor series multiply-add instruction code" is set in this field 51.

"One input register number of multiply operation of multiply-add operation" is set in the field 52, the "other input register number of multiply operation of multiply-add operation" is set in the field 53 and "output register number of operation result of multiply-add operation" is set in the field 54. Furthermore, a "Taylor series degree number" is set in the field 55.

In this way, the Taylor series multiply-add instruction 50 of this example embodiment adopts a configuration with the setting field 35 of the "register number of the register storing the set number of the coefficient table" removed from the Taylor series multiply-add instruction 30 in the second example embodiment shown in FIG. 3.

This example embodiment uses the sign bit of the register r2 storing the set number of the coefficient table (63rd bit in the example of FIG. 4) as the set number of the coefficient table and inputs this sign bit to the multiplexer 26 as a select signal.

Since the register of the processing apparatus 3 in this example embodiment has a 64-bit configuration, this sign bit is expressed as [63] in FIG. 4.

In the processing apparatus 3, an AND gate 61 is provided between a multiplexer 2033 and a floating point multiply-adder 1050.

The sign bit ([63]) of the register r2 is inputted to one input terminal 61a of this AND gate 61 and an instruction type code (Taylor series multiply-add instruction code) 51 of the Taylor series multiply-add instruction 50 is inputted to the other input terminal 61b.

In this example embodiment, the Taylor series multiply-add instruction code 51 is set to "1".

On the other hand, the instruction type code 2011 of the floating point multiply-add instruction 2010 shown in FIG. 8 is set to "0".

Since the input terminal 61b of the AND gate 61 is a negative logical input, the output of the AND gate 61 in execution of the Taylor series multiply-add instruction 50 is always "0".

On the other hand, the AND gate 61 in execution of the floating point multiply-add instruction 2010 outputs the value of the 63rd bit ([63]) of the register r2 inputted to the input terminal 61a just as is.

The output of the AND gate 61 is ANDed with the 63rd bit (sign bit) of the register r2 on a signal line 65 on which the output of the multiplexer 2032 (value of register r2) is inputted to the floating point multiply-adder 1050 and the result of the logical AND is inputted to the floating point multiply-adder 1050 through the signal line 65.

Therefore, when the processing apparatus 3 executes the Taylor series multiply-add instruction 50, the action of the AND gate 61 causes the sign bit of the value of the register r2 inputted to the floating point multiply-adder 1050 to be forcibly set to "0" (positive).

The AND gate 61 is provided to use the sign bit of the register r2 as the set number of the coefficient table when executing the Taylor series multiply-add instruction 50.

The reason that this AND gate 61 is provided will be explained in further detail.

When thinking of the cases with sin(x) and cos(x) as an example, since the other input data of multiply operation of multiply-add operation of the Taylor series multiply-add instruction 50 takes the value of 0 or y2 as has been proven in the second example embodiment, it is evident that the value is always positive.

For this reason, even when the set number of the coefficient table is set in the sign bit of the other input data of multiply operation of multiply-add operation, it is possible to execute a Taylor series operation without losing information of the original data.

In other words, in the cases of sin(x) and cos(x), the value of the other input register of multiply operation of multiply-add operation of the Taylor series multiply-add instruction 50 is known to be always positive, and therefore even when the sign bit of that value is used for the set number, if the sign bit of that value is returned to the original value before the value is inputted to the floating point multiply-adder 1050, the floating point multiply-adder 1050 executes the Taylor series operation correctly.

A specific example of use of the Taylor series multiply-add instruction 50 in this example embodiment will be explained using a sin function.

If the sin(x) input argument decision shows that x falls within a range of x=+π/4+2nπ to +3π/4++2nπ, sin(x) can be expressed by the following Taylor series operation after an input argument conversion.

$$\sin(x) = \cos\left(x - \frac{\pi}{2} - 2n\pi\right)$$
$$= \cos(y)$$
$$= \sum_n \frac{1}{(2n)!}(-1)^n y^{2n}$$
$$= \sum_n b_n y^{2n}$$

Here, bn corresponds to the coefficient table 12 in FIG. 2 whose set number is "1" (coefficient table of cos(x) Taylor series operation).

When calculated up to the fourteenth degree of the cos(y) Taylor series, the Taylor series operation can be expressed as:

$$\cos(y) = \sum_{n=0}^{7} b_n y^{2n}$$
$$= ((((((b_7 y^2 + b_6)y^2 + b_5)y^2 + b_4)y^2 + b_3)y^2 + b_2)y^2 + b_1)y^2 + b_0) \cdot 1$$

$$z = z \cdot 0 + b_7$$
$$z = z \cdot y^2 + b_6$$
$$z = z \cdot y^2 + b_5$$
$$z = z \cdot y^2 + b_4$$
$$\ldots$$
$$z = z \cdot y^2 + b_1$$

-continued $$z = z \cdot y^2 + b_0$$
$$z = z \cdot 1$$
$$z => \cos(y)$$

Therefore, as shown in 1 to 4 below, when the "register number" and "Taylor series degree number" are set in the respective specified fields 52 to 55 of the Taylor series multiply-add instruction 50 and the multiply-add operation to obtain z is executed successively, it is possible to calculate the value of sin(x) (=cos(y)), as follows.

1. Register number of the register storing one input register number of multiply operation of multiply-add operation 52: $z$ 2. Register number of the register storing the other input register number of multiply operation of multiply-add operation 53: "−0" or "−y2"

3. Register number of the register storing the output register number of operation result of multiply-add operation 54: $z$ 4. Values of Taylor series degree number 56: 0 to 7

In cases other than the case where the range of input argument x is +π/4+2nπ to +3π/4+2nπ, x can also be expressed likewise by a Taylor series operation after an input argument decision and input argument conversion.

Here, in 2 above, "−0" or "−y2" is set in the other input register number 53 of multiply operation of multiply-add operation because as described above, when the input argument x of sin(x) is in the range of +π/4+2nπ to +3π/4++2nπ, the value of sin(x) is calculated while performing a Taylor series operation using the coefficient stored in the coefficient table 12 shown in FIG. 2 whose set number is "1".

The same will also apply when the input argument x of sin(x) is in a range of x=+5π/4+2nπ to +7π/4++2nπ.

Next, a specific assembler instruction stream when a sin(x) (=cos(y)) Taylor series operation is executed using the Taylor series multiply-add instruction 50 will be explained.

The notation of assembler instruction of the Taylor series multiply-add instruction 50 is defined as follows as in the case of the second example embodiment. ftrimadd is the notation of assembler instruction of the Taylor series multiply-add instruction 50 and items in angle brackets are operands of the assembler instruction ftrimadd.

ftrimadd<one input register number of multiply operation of multiply-add operation>
<other input register number of multiply operation of multiply-add operation>
<Taylor series degree number>
<output register number of operation result of multiply-add operation>

Here, one input register number of multiply operation of multiply-add operation 32 is set to "6", the other input register number of multiply operation of multiply-add operation 33 is set to "0" or "2" and the output register number of operation result of multiply-add operation 34 is set to "6". Suppose a register number i is represented by %%fi, and %%f0=−0, %%f2=−y2, %%f4=1 and %%f6=z.

That is, "−0" is set in the register of register number 0 (%%f0), "−y2" is set in the register of register number 2 (%%f2), "1" is set in the register of register number 4 (%%f4) and the value of the register of register number 6 (%%f6) is "z".

In this case, the description of the assembler instruction stream for calculating the value of sin(x)(=cos(y)) using a Taylor series operation of up to the fourteenth degree is as follows:

| | |
|---|---|
| ftrimaddd | %%f6, %%f0, 7, %%f6 |
| ftrimaddd | %%f6, %%f2, 6, %%f6 |
| ftrimaddd | %%f6, %%f2, 5, %%f6 |
| ftrimaddd | %%f6, %%f2, 4, %%f6 |
| ftrimaddd | %%f6, %%f2, 3, %%f6 |
| ftrimaddd | %%f6, %%f2, 2, %%f6 |
| ftrimaddd | %%f6, %%f2, 1, %%f6 |
| ftrimaddd | %%f6, %%f2, 0, %%f6 |
| fmuld | %%f6, %%f4, %%f6 | where f muld is an assembler instruction for executing a multiply operation of z=z·1.

The operation when the processing apparatus 3 executes the above described assembler instruction stream will be explained.

When the coefficient table set 10 has the configuration as shown in FIG. 2, if the input argument x of sin(x) is −π/4+2nπ to +π/4+2nπ or +3π/4+2nπ to +5π/4+2nπ, the coefficient table 11 whose set number 22 is "0" is used, and therefore the sign bit ([63]) of the register r2 can be used as the set number of the coefficient table as is.

On the contrary, when the input argument x of sin(x) is +π/4+2nπ to +π3/4+2nπ or +5π/4+2nπ to +7π/4+2nπ, the coefficient table 12 whose set number 22 is "1" is used, and therefore the sign bit of the register r2 should always be set to "1" (negative).

However, as described above, the value of the "other input register of multiply operation of multiply-add operation" (register r2 in this example embodiment) of the Taylor series multiply-add instruction 50 used to calculate the value of sin(x) is "0" or "y2".

To solve this problem, "−0" and "−y2" are set in the other input register r2 of multiply operation of multiply-add operation.

The values of "−0" and "−y2" set in the register r2 are converted to "0" and "y2" before being inputted to the floating point multiply-adder 1050 by the action of the aforementioned AND gate 61.

This allows the floating point multiply-adder 1050 to correctly execute the Taylor series operation of sin(x)(=cos(y)).

In cases other than sin(x) and cos(x), by using a few lower bits of the mantissa of the "other input data of multiply operation of multiply-add operation" for the set number of the coefficient table at the sacrifice of the accuracy of input data to a certain extent, it is possible to correctly indicate the set number of the coefficient table using the value of the other input register of multiply operation of multiply-add operation in the same way as sin(x) and cos(x).

In this example embodiment, some bits of the other input register of multiply operation of multiply-add operation are used to specify the set number of the coefficient table, but some bits of one input register of multiply operation of multiply-add operation may also be used to specify the set number of the coefficient table.

Figure 5:
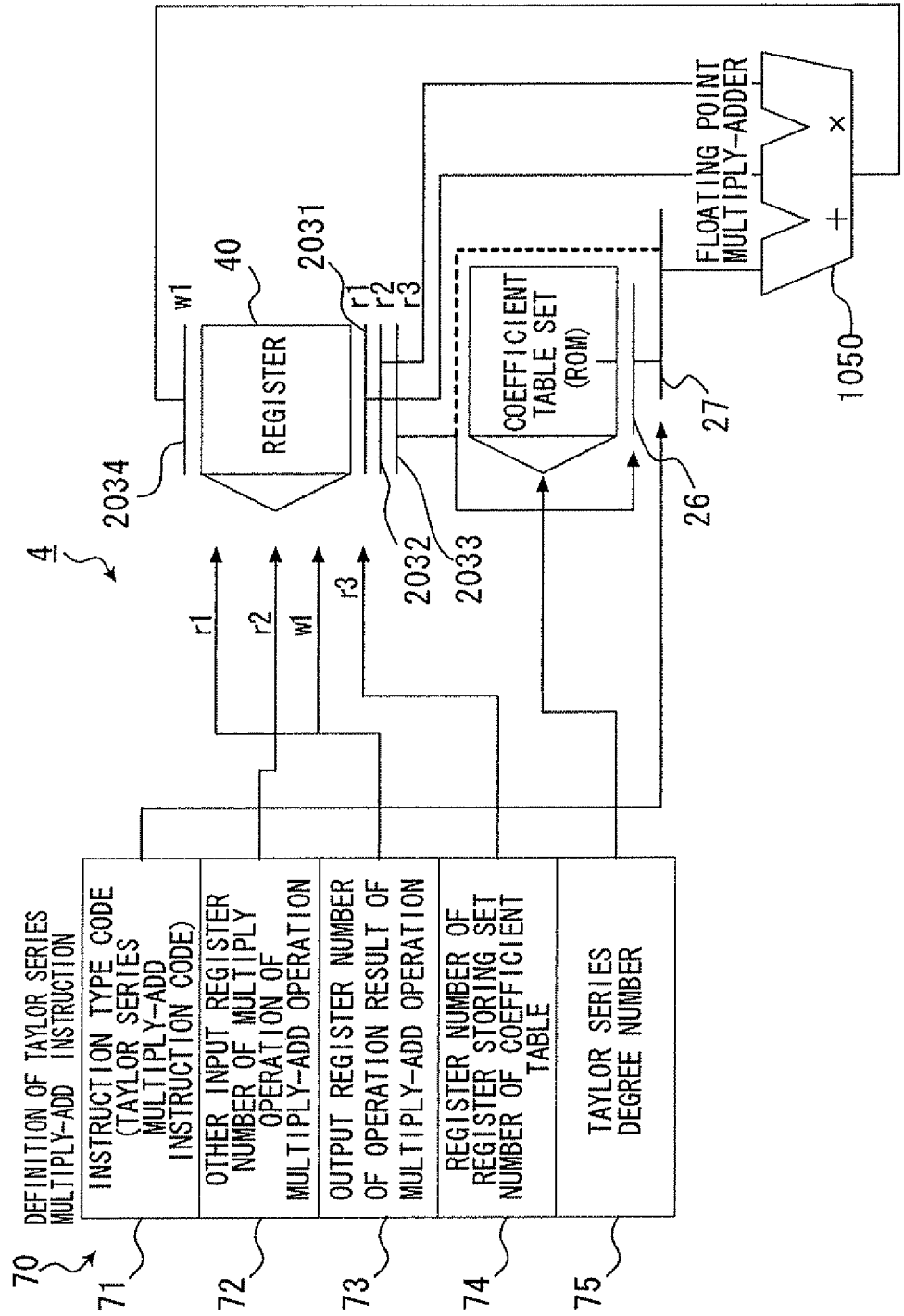
FIG. 5 is a block diagram illustrating configuration of parts of a processing apparatus of an example embodiment.

FIG. 5 shows the configuration of main parts of a processing apparatus according to an example embodiment of the present invention.

In FIG. 5, the same components as those in FIG. 3 are assigned the same reference numerals.

As has been explained in the second example embodiment, when a Taylor series operation is executed, "one input register number of multiply operation of multiply-add operation" and "output register number of operation result of multiply-add operation" indicate the same register number.

Focusing attention on this point, the processing apparatus 4 of this example embodiment omits the field 32 of "one input register number of multiply operation of multiply-add operation" from the Taylor series multiply-add instruction 30 shown in FIG. 3 and uses the field 33 of "output register number of operation result of multiply-add operation" also as a field to specify "one input register number of multiply operation of multiply-add operation", instead.

A Taylor series multiply-add instruction 70 provided for the processing apparatus 4 of this example embodiment is shown on the left side of FIG. 5.

The Taylor series multiply-add instruction 70 of this example embodiment is made up of five fields 71 to 75.

An "instruction type code (Taylor series multiply-add instruction code) is set in the field 71, the "other input register number of multiply operation of multiply-add operation" is set in the field 72 and the "output register number of operation result of multiply-add operation" is set in the field 73.

Furthermore, the "register number of the register storing set numbers of the coefficient table" is set in the field 74 and the "Taylor series degree number" is set in the field 75.

The Taylor series multiply-add instruction 70 of this example embodiment uses the "output register number of operation result of multiply-add operation (w1)" set in the field 73 also as the "one input register number of multiply operation of multiply-add operation (r1)."

This has an effect of being able to reduce the register specification field of the Taylor series multiply-add instruction.

The operation of this example embodiment is the same as the aforementioned third example embodiment except in that the "output register number of operation result of multiply-add operation" set in the field 73 of the Taylor series multiply-add instruction 70 is used to read the input register r1 storing one value of multiply operation of multiply-add operation from a register 40.

In this example embodiment, the "output register number of operation result of multiply-add operation (w1)" is also used as "one input register number of multiply operation of multiply-add operation (r1)", but on the contrary, it is also possible to provide the Taylor series multiply-add instruction with a field for setting "one input register number of multiply operation of multiply-add operation" and omit the "output register number of operation result of multiply-add operation (W1)" so that "one input register number of multiply operation of multiply-add operation (r1)" also serves as the "output register number of operation result of multiply-add operation (w1)."

Such a processing apparatus can be realized in substantially the same configuration as that in FIG. 5.

That is, a setting field of "one input register number of multiply operation of multiply-add operation (r1)" is provided in the Taylor series multiply-add instruction 70 instead of the setting field 73 of the "output register number of operation result of multiply-add operation (w1)." The register number r1 may also be inputted to the register 40 as the register number w1.

Figure 6:
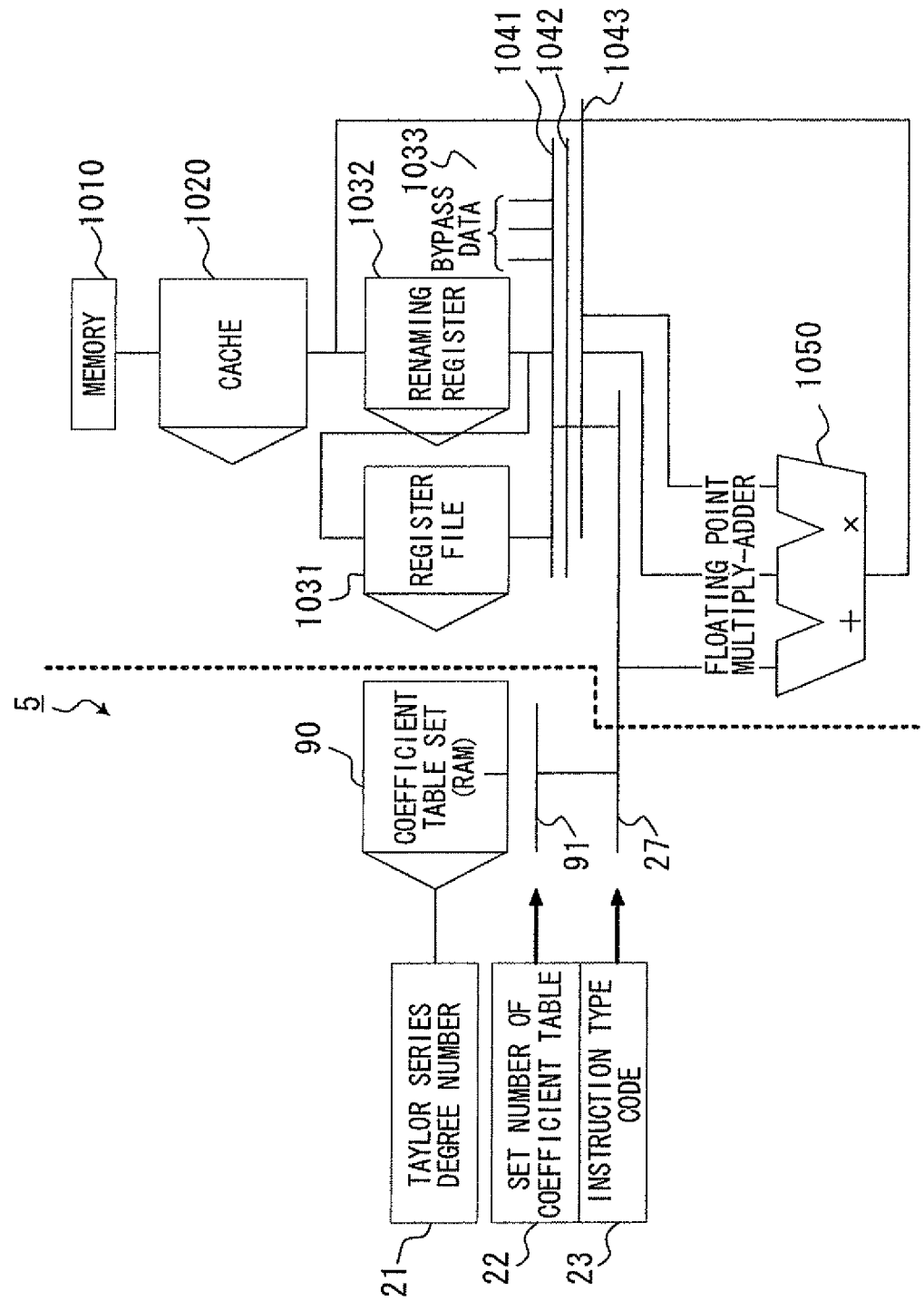
FIG. 6 is a block diagram illustrating the system configuration of a processing apparatus of an example embodiment.

FIG. 6 is a block diagram showing the system configuration of a processing apparatus according to an example embodiment of the present invention.

In FIG. 6, the same components as those in FIG. 1 are assigned the same reference numerals.

The processing apparatus 5 of this example embodiment is different in configuration from that of the processing apparatus 1 according to the first example embodiment in that a coefficient table set 90 is mounted in a RAM (Random Access Memory).

In the processing apparatus 1 of the first example embodiment, the coefficient table set 10 is mounted in a ROM.

The processing apparatus 5 of this example embodiment has the advantage over the processing apparatus 1 of the first example embodiment in that the content of the coefficient table set 90 is rewritable.

For this reason, the processing apparatus 5 of this example embodiment can update values of the coefficient table, switch between coefficient tables and add coefficient tables or the like.

FIG. 7 shows main parts of a processing apparatus according to an example embodiment of the present invention.

In FIG. 7, the same components as those in FIG. 3 and FIG. 6 are assigned the same reference numerals.

The format of a coefficient table set update instruction 100 provided for the processing apparatus 6 of this example embodiment is shown on the left side of FIG. 7.

The coefficient table set update instruction 100 is an instruction that causes a floating point multiply-adder 1050 to execute a multiply operation and write the operation result into a storage area of a Taylor series degree number specified in a specified coefficient table set in the coefficient table.

The processing apparatus 6 executes this coefficient table set update instruction 100 and updates the coefficient data of the coefficient table set 90.

Since only a multiply operation is performed in execution of the coefficient table set update instruction 100, input data for addition of the floating point multiply-adder 1050 is fixed to "0".

Two pieces of operand data for multiply operation used when the floating point multiply-adder 1050 executes the coefficient table set update instruction 100 are the value of a register r1 and the value of a register r2.

These two pieces of operand data are specified by the coefficient table set update instruction 100.

The coefficient table set update instruction 100 is made up of five fields 101 to 105.

A "coefficient table set update instruction code" is set in the field 101 as an instruction type code.

A "one input register number of multiply operation of multiply-add operation" (register number of register r1 in this example embodiment) is set in the field 102.

The "other input register number of multiply operation of multiply-add operation" (register number of register number r2 in this example embodiment) is set in the field 103.

The "register number of the register storing set numbers of the coefficient table" (register number of register number r3 in this example embodiment) is set in the field 104. A "Taylor series degree number" is set in the field 105.

The above described "one input register number of multiply operation of multiply-add operation" and "other input register number of multiply operation of multiply-add operation" are respective register numbers of a register (first register r1) storing one operand data and a register (second register r2) storing the other operand data used by the floating point multiply-adder 1050 for a multiply operation of multiply-add operation.

Furthermore, the above described "register number of the register storing set numbers of the coefficient table" is a register number of a register (third register r3) storing information for specifying a coefficient table (coefficient table subject to data update) whose data is to be updated.

The "Taylor series degree number" is information for specifying the degree of Taylor series subject to data update.

In this example embodiment, since the degrees of Taylor series coefficients are configured so as to correspond to row numbers of the coefficient table as described above, addresses of the data to be updated in the coefficient table set (RAM) 90 are determined by the coefficient table subject to data update and the degree of Taylor series of the data to be updated.

That is, it is possible to know the address of storage of the data to be updated in the coefficient table set (RAM) 90 according to the value of the register r3 and the Taylor series degree number 21.

When the coefficient table set update instruction 100 is decoded, the value of the register r1, the value of the register r2 and the value of the register r3 are read from a register 40.

The value of the register r1 and the value of the register r2 are inputted to the floating point multiply-adder 1050 as operand data through a multiplexer 2031 and a multiplexer 2032 respectively.

The floating point multiply-adder 1050 performs a multiply operation on the value of the register r1 and the value of the register r2 and outputs the multiply operation result to a multiplexer 93.

The value of the register r3 is inputted to the multiplexer 93 as a select signal (column address signal of the coefficient table set (RAM) 90) through a multiplexer 1023.

The Taylor series degree number 105 is inputted to the coefficient table set (RAM) 90 as the row address signal.

The multiply operation result of the floating point multiply-adder 1050 is selected and outputted from the multiplexer 93 and written at an address determined by the row address signal and the column address signal of the coefficient table set (RAM) 90.

This causes the coefficient data of the coefficient table specified by the coefficient table set update instruction 100 to be updated.

Thus, this example embodiment allows the coefficient data to be written at an arbitrary address of the coefficient table set 90.

Therefore, this example embodiment allows the coefficient data of the coefficient table stored in the coefficient table set 90 to be updated and allows the coefficient table to be changed or the like.

Furthermore, this example embodiment also allows a new coefficient table to be added to the coefficient table set 90 by the processing apparatus 6 executing the coefficient table set update instruction 100.

In this example embodiment, the update data of the coefficient table set (RAM) 90 is obtained by the floating point multiply-adder 1050 performing a multiply operation on two pieces of data stored in the register 40, but it is also possible to adopt a configuration whereby the update data can be set in the field of the coefficient table set update instruction as an immediate value.

Furthermore, the Taylor series multiply-add instruction of each of the second to fourth example embodiments can be used as the Taylor series multiply-add instruction to be executed when the processing apparatus 6 of this example embodiment performs a Taylor series operation.

Although a few example embodiments have been shown and described, it would be appreciated by those skilled in the art that changes may be made in these example embodiments without departing from the principles and spirit of the invention, the scope of which is defined in the claims and their equivalents.

What is claimed is:

1. A processing apparatus comprising:
a register that stores operand data;
a storage that stores a plurality of coefficient tables each storing Taylor series operation coefficient data;
and a processor to execute:
reading the operand data stored in the register;
selecting the Taylor series operation coefficient data to be processed from among the plurality of coefficient tables using degree information of a Taylor series and coefficient table identification information identifying a coefficient table of the plurality of coefficient tables;
decoding a floating point operation instruction of the operand data stored in the register; and
performing the Taylor series operation by executing the floating point operation instruction using the selected Taylor series coefficient data, and data read from the register or bypass data, and
wherein execution of the floating point instruction includes reading from the floating point instruction
a field including an instruction type code to indicate a Taylor series multiply-add instruction, a field including first information to indicate a register to store one operand value of a multiply operation of a floating point multiply-add operation, a field including second information indicating a register to store another operand value of the multiply operation of the floating point multiply-add operation, a field including third information to specify a register to which the operation result of the floating point multiply-add operation should be output, a field including fourth information to specify a register storing identification information of a coefficient table and a field including fifth information to specify the degree of the Taylor series, and
wherein data necessary for a floating point multiply-adder to execute the Taylor series operation is read from the register and the storage through the reading of the operand data and the reading of the Taylor series operation coefficient data according to a result of the decoding where the floating point operation instruction includes a Taylor series multiply-add instruction and the data is supplied to the processor.

2. A processing apparatus comprising:
a register that stores operand data;
a storage that stores a plurality of coefficient tables each storing Taylor series operation coefficient data;
and a processor to execute:
reading the operand data stored in the register;
selecting the Taylor series operation coefficient data to be processed from among the plurality of coefficient tables using degree information of a Taylor series and coefficient table identification information identifying a coefficient table of the plurality of coefficient tables;
decoding a floating point operation instruction of the operand data stored in the register; and
performing the Taylor series operation by executing the floating point operation instruction using the selected Taylor series coefficient data, and data read from the register or bypass data, and
wherein execution of the floating point instruction includes reading from the floating point instruction
a field including an instruction type code to indicate a Taylor series multiply-add instruction, a field including first information to indicate a register storing one operand value of a multiply operation of a floating point multiply-add operation, a field including second information to specify a register storing another operand value of a multiply operation of the multiply-add operation of the floating point multiply-add operation, a field including third information to specify a register to which an operation result of the floating point multiply-add operation should be output and a field including fourth information to specify the degree of Taylor series, and wherein some bits of the data of the register specified by the second information are used as information specifying identification information of the coefficient table, data necessary for a floating point multiply-adder to execute the Taylor series operation is read from the register and the storage through the reading of the operand data and the reading of the Taylor series operation coefficient data according to a decoding result of the decoding where the floating point operation instruction includes a Taylor series multiply-add instruction and the data is supplied to the processor.

3. A processing apparatus comprising:

a register that stores operand data;

a storage that stores a plurality of coefficient tables each storing Taylor series operation coefficient data;

and a processor to execute:

reading the operand data stored in the register;

selecting the Taylor series operation coefficient data to be processed from among the plurality of coefficient tables using degree information of a Taylor series and coefficient table identification information identifying a coefficient table of the plurality of coefficient tables;

decoding a floating point operation instruction of the operand data stored in the register; and performing the Taylor series operation by executing the floating point operation instruction using the selected Taylor series coefficient data, and data read from the register or bypass data, and wherein execution of the floating point instruction includes reading from the floating point instruction a field including an instruction type code to indicate a Taylor series multiply-add instruction, a field including first information to indicate a register storing one operand value of a multiply operation of a floating point multiply-add operation, a field including second information to specify a register storing another operand value of multiply operation of a multiply-add operation of the floating point multiply-add operation, a field including third information to specify a register to which an operation result of the floating point multiply-add operation should be output and a field including fourth information to specify the degree of Taylor series, and wherein some bits of the data of the register specified by the first information are used as information specifying identification information of the coefficient table, data necessary for a floating point multiply-adder to execute a Taylor series operation is read from the register and the storage through the reading of the operand data and the reading of the Taylor series operation coefficient data according to a decoding result of the decoding where the floating point operation instruction includes a Taylor series multiply-add instruction and the data is supplied to the processor.

4. A processing apparatus comprising:

a register that stores operand data;

a storage that stores a plurality of coefficient tables each storing Taylor series operation coefficient data;

and a processor to execute:

reading the operand data stored in the register;

selecting the Taylor series operation coefficient data to be processed from among the plurality of coefficient tables using degree information of a Taylor series and coefficient table identification information identifying a coefficient table of the plurality of coefficient tables;

decoding a floating point operation instruction of the operand data stored in the register; and performing the Taylor series operation by executing the floating point operation instruction using the selected Taylor series coefficient data, and data read from the register or bypass data, and wherein execution of the floating point instruction includes omitting, during reading of the floating point instruction, a field including first information to specify a number of a register storing one operand value of a multiply operation of a floating point multiply-add operation, setting third information to specify the register to which the operation result of the floating point multiply-add operation should be output as information specifying a register storing one operand value of a multiply operation of the floating point multiply-add operation instead, and reading data necessary for a floating point multiply-adder to execute the Taylor series operation from the register and the storage through the reading of the operand data and the reading of the Taylor series operation coefficient data according to a decoding result of the decoding where the floating point operation instruction includes a Taylor series multiply-add instruction and supplies the data to the processor.

5. The processing apparatus according to claim 1, wherein execution of the floating point operation instruction omits reading from the floating point instruction, a field to set the second information specifying the number of the register storing the other operand value of the multiply operation of the floating point multiply-add operation, uses the third information specifying the register to which the operation result of the floating point multiply-add operation should be output as information specifying the register storing the other operand value of the multiply operation of the floating point multiply-add operation instead, and reads data necessary for the floating point multiply-adder to execute the Taylor series operation from the register and the storage through the reading of the operand data and the reading of the Taylor series operation coefficient data according to the decoding result of the Taylor series multiply-add instruction and supplies the data to the processor.

6. A processing apparatus comprising:

a register that stores operand data;

a storage that stores a plurality of coefficient tables each storing Taylor series operation coefficient data;

and a processor to execute:

reading the operand data stored in the register;

selecting the Taylor series operation coefficient data to be processed from among the plurality of coefficient tables using degree information of a Taylor series and coefficient table identification information identifying a coefficient table of the plurality of coefficient tables;

decoding a floating point operation instruction of the operand data stored in the register; and performing the Taylor series operation by executing the floating point operation instruction using the selected Taylor series coefficient data, and data read from the register or bypass data, and wherein execution of the floating point instruction includes reading from the floating point instruction a field including an instruction type code indicating data update of the coefficient table, a field including first information to specify a register storing one operand value of a multiply operation of a multiply-add operation, a field including second information to specify a register storing another operand value of the multiply operation of the multiply-add operation, a field including third information to specify a register storing identification information of the coefficient table, and a field including fourth information to specify the degree information of the Taylor series, and wherein the setting causes the processor to execute a multiply operation of a first register value specified by the first information and a second register value specified by the second information according to a decoding result of the decoding where the floating point operation instruction includes a coefficient table set update instruction and writes a multiply operation result in a storage area of the Taylor series operation coefficient data of the degree specified by the fourth information of the coefficient table specified by the value of the register specified by the third information.

\* \* \* \* \*